(12) United States Patent
Suchecki

(10) Patent No.: US 9,695,744 B2
(45) Date of Patent: Jul. 4, 2017

(54) ENGINE DRIVE SYSTEM

(75) Inventor: Tom Suchecki, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1250 days.

(21) Appl. No.: 12/902,917

(22) Filed: Oct. 12, 2010

(65) Prior Publication Data

US 2012/0088617 A1 Apr. 12, 2012

(51) Int. Cl.
| | | |
|---|---|---|
| *F02B 67/06* | (2006.01) | |
| *F01L 1/02* | (2006.01) | |
| *F16H 7/08* | (2006.01) | |
| *F01L 1/053* | (2006.01) | |

(52) U.S. Cl.
CPC .............. *F02B 67/06* (2013.01); *F01L 1/022* (2013.01); *F01L 1/024* (2013.01); *F16H 7/08* (2013.01); *F01L 2001/0537* (2013.01)

(58) Field of Classification Search
USPC .......................................... 474/137, 118, 101
See application file for complete search history.

(56) References Cited

U.S. PATENT DOCUMENTS

| | | | | |
|---|---|---|---|---|
| 2,279,413 A | * | 4/1942 | Read | 123/378 |
| 3,338,104 A | * | 8/1967 | Drain | 74/3.52 |
| 3,613,645 A | | 10/1971 | Froumajou | |
| 4,031,761 A | | 6/1977 | Fisher et al. | |
| 4,525,151 A | * | 6/1985 | Tomita et al. | 474/101 |
| 4,674,452 A | | 6/1987 | Asanomi | |
| 4,691,668 A | | 9/1987 | West | |
| 4,715,333 A | | 12/1987 | Oyaizu | |
| 4,929,218 A | * | 5/1990 | Clough | 474/83 |
| 4,981,116 A | | 1/1991 | Trinquard | |
| 5,216,989 A | * | 6/1993 | Iwata et al. | 123/90.31 |
| 6,830,524 B2 | * | 12/2004 | Tamai | 474/134 |
| 6,932,039 B2 | * | 8/2005 | Takahashi et al. | 123/90.17 |
| 2001/0007839 A1 | * | 7/2001 | Guhr | 474/101 |
| 2005/0279303 A1 | * | 12/2005 | Murata | 123/90.16 |
| 2006/0135302 A1 | * | 6/2006 | Manfredotti et al. | 474/87 |
| 2006/0229151 A1 | * | 10/2006 | Jansen et al. | 474/117 |
| 2009/0131207 A1 | * | 5/2009 | Grossman | 474/87 |
| 2011/0264359 A1 | * | 10/2011 | Lent | 701/112 |

FOREIGN PATENT DOCUMENTS

| | | |
|---|---|---|
| JP | 1073130 A | 3/1989 |
| JP | 1073131 A | 3/1989 |

* cited by examiner

*Primary Examiner* — Minh Truong
(74) *Attorney, Agent, or Firm* — Julia Voutyras; McCoy Russell LLP

(57) ABSTRACT

A system for an engine drive that engages a single timing band with a camshaft, a crankshaft and various accessory drives in such a configuration that the camshaft is rotated in a direction opposite that of the crankshaft, while ensuring a reflex wrap angle around each drive sprocket coupled to the camshaft, crankshaft and various accessory drives.

20 Claims, 3 Drawing Sheets

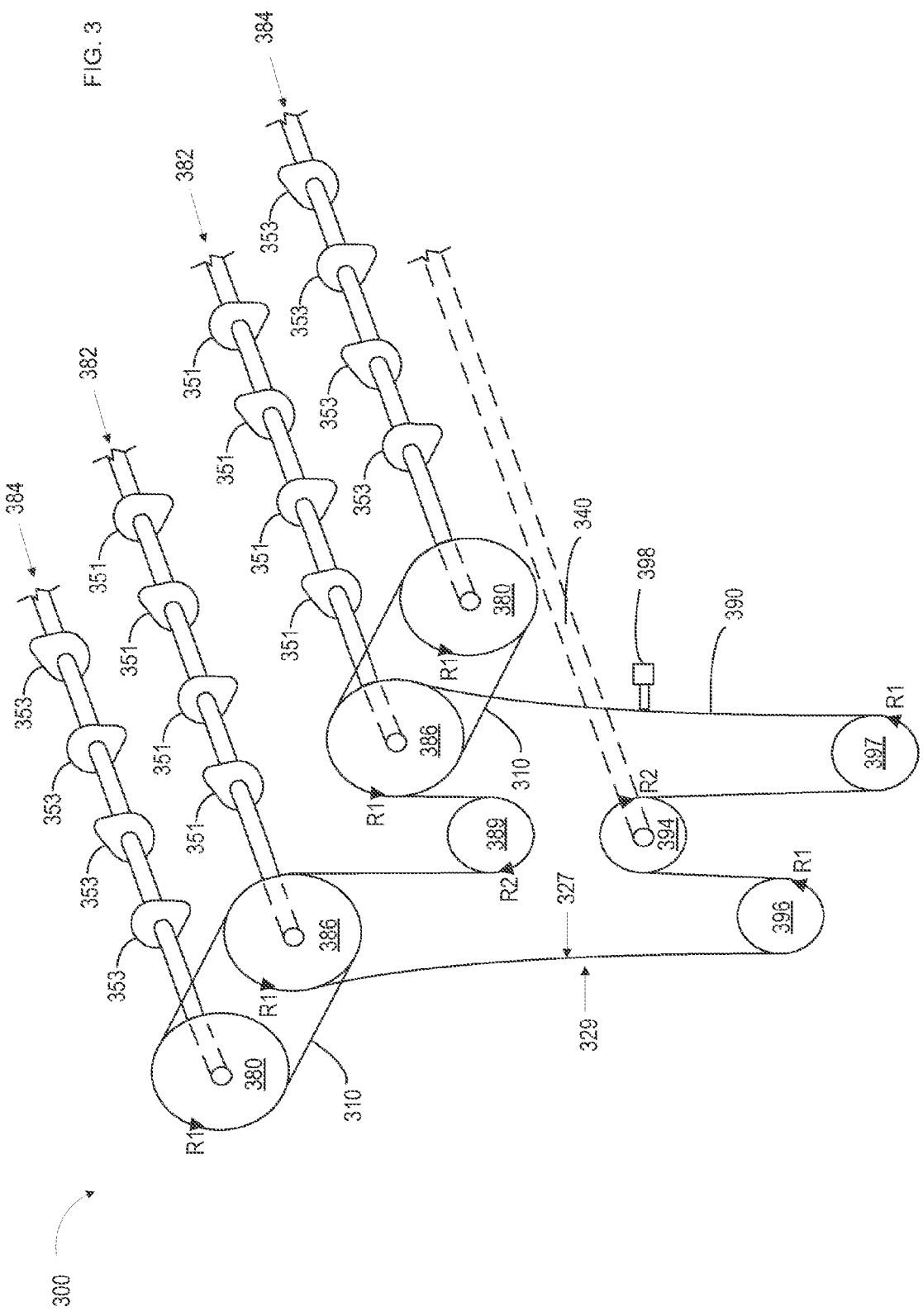

ENGINE DRIVE SYSTEM

BACKGROUND AND SUMMARY

Vehicles may use a timing belt or chain to drive various features in an internal combustion engine.

For example, U.S. Pat. No. 4,715,333 describes a camshaft drive arrangement that allows for valve timing adjustment. The system includes a flexible transmitting belt that may engage with a pair of opposing pulleys and a plurality of sprockets as well as a tensioning pulley in order to drive rotating parts with a single belt.

The inventors herein have recognized various issues with the above system. In particular, increasing the number of sprockets and/or pulleys to retain a reflex wrap angle also increases the size and weight of the camshaft drive.

As such, one example approach to address the above issues is to engage the camshaft drive and the crankshaft drive with different, opposing sides of a band, such as a timing belt and/or timing chain. In this way, it is possible to achieve a reflex wrap angle around the sprockets, pulleys and/or additional features engaged with the timing band, while maintaining a compact configuration and package. Specifically, the camshaft engages a first side of the timing band and the crankshaft engages a second, opposite, side of the timing band. This configuration enables the crankshaft to be arranged within a more central location of the engine drive system, if desired, and thus the engine drive system may be arranged in a more compact design. Further, by taking advantage of two sides of the timing band and arranging the crankshaft in a more central location, a reflex wrap angle around the drive sprockets may be achieved without the inclusion of additional sprockets, pulleys, idling devices and/or tensioning devices (although such additional devices can be included, if desired).

Note that various bands may be used, such as timing chain, a timing belt, or various other types of elastic and/or inelastic flexible bands. Further, the band may mate to toothed or un-toothed pulleys on the various shafts. Further still, additional bands may also be used, if desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is a schematic diagram of another engine drive system embodiment.

DETAILED DESCRIPTION

The following description relates to an engine drive system that includes a camshaft drive and a crankshaft drive, which are arranged in such a way that a timing band engages the camshaft drive and the crankshaft drive and rotates each drive in opposite directions. This arrangement allows additional accessory drives to be engaged with the timing band while retaining a reflex wrap angle around each drive sprocket of the camshaft and crankshaft. This engine drive allows for a more compact design with a lower weight than traditional designs due to the resulting geometric configuration. Various accessory drives may be included in the disclosed engine drive system. For example, an oil pump and a balance shaft may be driven by the disclosed engine drive system. The engine drive system may utilize a continuous timing band that may follow a serpentine path and may engage various drive sprockets in different ways; for example, by engaging different sides of the timing band, by rotating the drive sprockets in different directions, and by arranging drive sprockets within different areas of the engine drive system. Additionally, the engine drive system may include various pulleys, idlers and tensioning devices to further ensure a reflex wrap angle.

Figure 1:
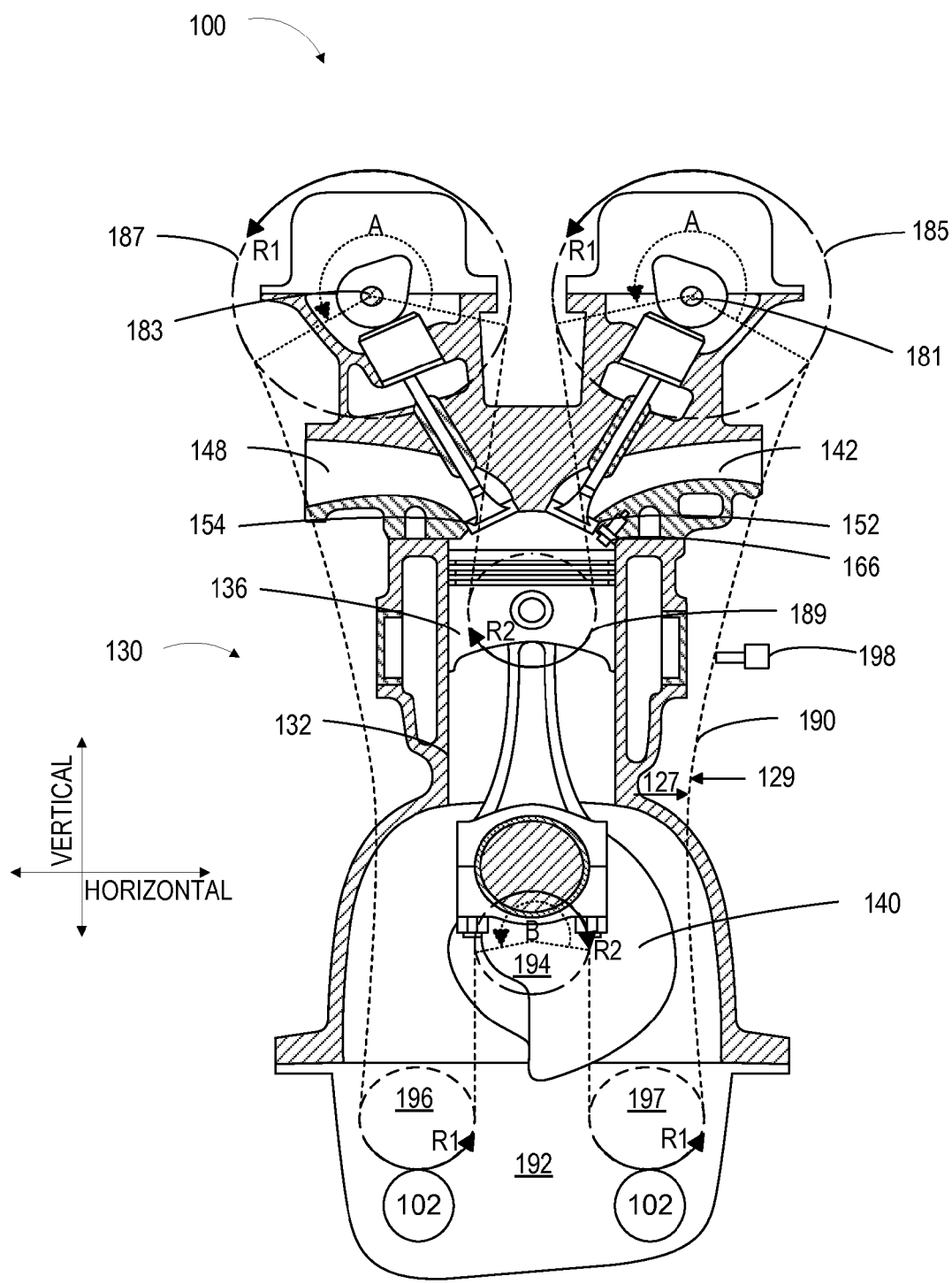
FIG. 1 is a schematic diagram of an example engine drive system.
Figure 2:
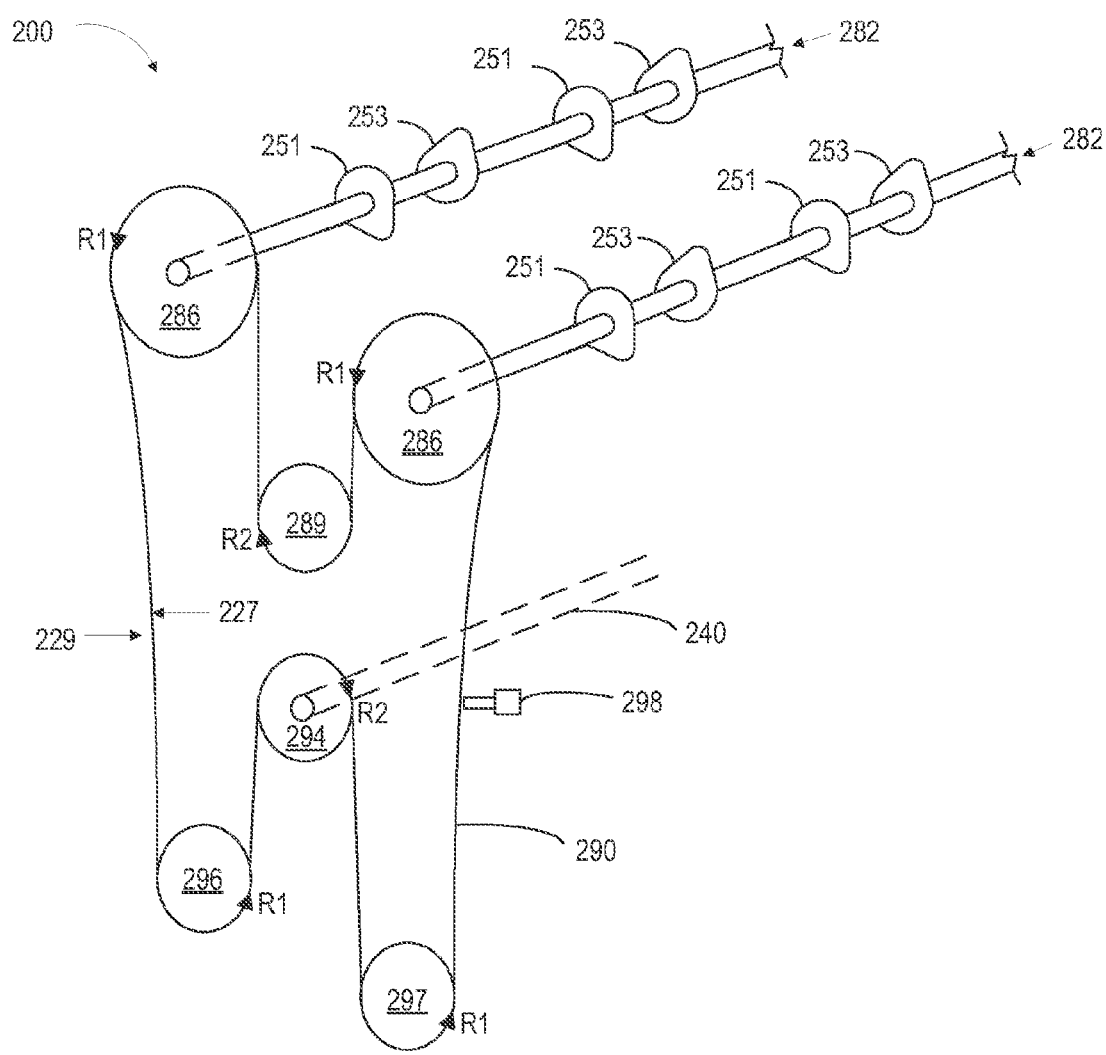
FIG. 2 is schematic diagram of an engine drive system embodiment.

An example engine drive system for an inline engine is depicted in FIG. 1. An embodiment of an engine drive system for a single overhead cam (SOHC) V-engine is depicted in FIG. 2, and FIG. 3 shows another embodiment of a dual overhead cam (DOHC) engine drive system for a V-engine.

Referring specifically to FIG. 1, it includes a schematic diagram of an example drive system showing one cylinder of a multi-cylinder inline engine.

Combustion cylinder 130 of a multi-cylinder engine may include combustion cylinder walls 132 with piston 136 positioned therein. Piston 136 may be coupled to crankshaft 140 so that reciprocating motion of the piston is translated into rotational motion of the crankshaft. Crankshaft 140 may be coupled to crankshaft sprocket 194 and crankshaft 140 may also be coupled to at least one drive wheel of a vehicle via an intermediate transmission system (not shown). Further, a starter motor (not shown) may be coupled to crankshaft 140 via a flywheel to enable a starting operation of the multi-cylinder engine. Crankshaft 140 may be lubricated with oil contained within oil sump 192.

Combustion cylinder 130 may receive air via intake passage 142 and may exhaust combustion gases via exhaust passage 148. Intake passage 142 and exhaust passage 148 may selectively communicate with combustion cylinder 130 via respective intake valve 152 and exhaust valve 158. In some embodiments, combustion cylinder 130 may include two or more intake valves and/or two or more exhaust valves.

In this example, intake valve 152 and exhaust valve 154 may be stimulated by camshafts 181 and 183 respectively, shown here as including camshaft lobes. Intake valve 152 and exhaust valve 154 may be further controlled by one or more cam actuation systems (not shown) which may each include one or more cams and may utilize one or more of cam profile switching (CPS), variable cam timing (VCT), variable valve timing (VVT) and/or variable valve lift (VVL) systems that may be operated by a controller to vary valve operation. The position of intake valve 152 and exhaust valve 154 may be determined by position sensors and intake valve 152 and/or exhaust valve 154 may be controlled by electric valve actuation.

Fuel injector 166 is shown coupled directly to combustion cylinder 130 for injecting fuel directly therein in proportion to the pulse width of signal FPW received from a controller. In this manner, fuel injector 166 provides what is known as direct injection of fuel into combustion cylinder 130. The fuel injector may be mounted on the side of the combustion cylinder or in the top of the combustion cylinder, for example. Fuel may be delivered to fuel injector 166 by a fuel delivery system (not shown) including a fuel tank, a fuel pump, and a fuel rail. In some embodiments, combustion cylinder 130 may alternatively or additionally include a fuel injector arranged in intake passage 142 in a configuration that provides what is known as port injection of fuel into the intake port upstream of combustion cylinder 130.

The engine drive system 100, as shown in FIG. 1, uses a band 190 to synchronize various rotating parts. Band 190 has a first contacting side 127 and a second contacting side 129 opposite side 127. Band 190 may also have two additional side edges, for example, two side edges that constitute the width of band 190 that may not be a contacting side. The contacting sides 127 and 129 may engage various components of the engine drive system 100 in face-sharing contact to drive those components, as described below, whereas the side edges may not.

Band 190 may be a timing belt or timing chain, and may be formed as a single continuous band that follows a serpentine path. Band 190 may be a timing belt such as a V-belt or a V-ribbed belt, or band 190 may be a timing chain. Band 190 may have chain links coupled to each other with pins or band 190 may otherwise have chain elements with holes that engage with sprocket teeth. Alternatively, band 190 may be a rubber belt without holes. Band 190 may engage and couple the camshafts and crankshafts via various devices such as sprockets. Further, the band 190 may engage and couple various additional accessory devices via devices such as sprockets. Moreover, band 190 may engage additional devices such as pulleys and/or idlers.

In one example, band 190 may engage toothed sprockets, where holes in the band align with the teeth of the sprocket. In another example, band 190 may contact a device without teeth such that a surface of the band may be in contact with a surface of the device, where the surface of the device may include a groove. Band 190 may contact each device with a wrap angle, which for one or more devices is a reflex wrap angle. Here, the wrap angle corresponds to an arc length of contact between the band 190 and the various sprockets, pulleys, etc. and a reflex wrap angle may be 180 degrees or more, but less than 360 degrees. Additionally, band 190 may engage some devices with a wrap angle that is smaller than a reflex wrap angle.

Camshafts 181 and 183 are shown coupled to band 190 via camshaft sprockets 185 and 187 respectively. Camshaft 181 and camshaft sprocket 185 are coupled such that they rotate together, and likewise, camshaft 183 and camshaft sprocket 187 are coupled such that they rotate together. Camshaft sprockets 185 and 187 engage with first contacting side 127 of band 190 in which the arc length of contact between camshaft sprocket 185 and band 190 as well as the arc length of contact between camshaft sprocket 187 and band 190 corresponds to a reflex wrap angle A. Further, camshafts 181 and 183 along with corresponding camshaft sprockets 185 and 187 rotate in a direction R1.

Camshaft sprockets 185 and 187 are shown with a diameter that is twice the diameter of crankshaft sprocket 194 to provide desired timing of intake valve 152 and exhaust valve 154 during the four-stoke combustion cycle. Alternatively, camshaft sprockets 185 and 187 may be another size, if desired.

Crankshaft 140 is shown coupled to band 190 via crankshaft sprocket 194 such that crankshaft 140 and crankshaft sprocket 194 rotate together. Crankshaft sprocket 194 engages with second contacting side 129 of band 190, in which the arc length of contact between the crankshaft sprocket 194 and band 190 corresponds to a reflex wrap angle B. In one example, the wrap angles A and B may be substantially the same, or A may be a greater or less angle than B. Further, crankshaft 140 and corresponding crankshaft sprocket 194 rotate in a direction R2 that is opposite of direction R1. In this way, crankshaft 140 is configured such that its direction of rotation is opposite that of camshafts 181 and 183.

A plurality of accessory devices 102 may be coupled to band 190 via a plurality of accessory device sprockets 196 and 197, where a separate accessory device is coupled to each sprocket, such as a first device coupled to a first sprocket and a second device coupled to a second sprocket, and so on. The accessory devices may include one or more of an oil pump, a balance shaft, a water pump, a power steering pump, an air conditioning compressor, a fan, and a fuel pump, which are provided as non-limiting examples. For example, in one example, a balance shaft may be coupled to a first sprocket 196, where a fuel pump is coupled to sprocket 197. In another example, a balance shaft may be coupled to a first sprocket 196, where a water pump is coupled to sprocket 197.

As shown, the plurality of accessory drive sprockets 196, 197 may engage with band 190 via first contacting side 127 and rotate in direction R1; however, it will be appreciated that one or more accessory drive sprockets 196, 197 may additionally or alternatively engage with second contacting side 129 of band 190 and rotate in direction R2. Further, in another example, a first accessory may engage first contacting side 127, and a second accessory may engage second contacting side 129, which may provide a rotation of the first accessory in direction R1 and a rotation of the second accessory in direction R2, respectively. The plurality of accessory device sprockets 196 and 197 may engage with band 190 with a reflex wrap angle. As another example, device sprockets 196 and 197 may engage with band 190 with a wrap angle that is less than a reflex angle.

Idling device 189 is shown engaged with second contacting side 129 of band 190 with a direction of rotation R2. Idling device 189 may be a pulley or a sprocket. Alternatively, idling device 189 may be a drive sprocket. It will be appreciated that engine drive system 100 may include more than one idling device 189 and each idling device may engage band 190 with first contacting side 127 and/or second contacting side 129. If idling device 189 engages with band 190 on first contacting side 127, idling device 189 may rotate in direction R1. Idling device 189 may be positioned to adjust the wrap angle between band 190 and one or more of camshaft sprockets 185 and 187, crankshaft sprocket 194, and the plurality of accessory device sprockets 196 and 197.

Tensioning device 198 is shown engaged with band 190 on second contacting side 129, alternatively or additionally, tensioning device 198 may engage with band 190 on first contacting side 127. Tensioning device 198 may employ various pulleys, springs, levers and other adjustment mechanisms to actively adjust the tension of band 190 which may further ensure a reflex wrap angle around each sprocket, idler, pulley and the like. However, it will also be appreciated that engine drive system 100 may include sprockets, idlers and pulleys with a smaller wrap angle.

The geometric configuration of the engine drive system 100 includes arranging camshaft sprockets 185 and 187 as well as accessory device sprockets 196 and 197 within continuous band 190. Further, crankshaft sprocket 194 and idling device 189 may be positioned outside continuous band 190. However, it will be appreciated that one or more accessory device sprockets 196, 197 could be positioned outside band 190 and/or idling device 189 could be positioned within band 190, if desired. Crankshaft sprocket 194 may configured to reside along a vertical line that passes between camshaft sprockets 185 and 187. In another example, crankshaft sprocket 194 may be configured to reside along a vertical line that passes between camshaft sprockets 185 and 187 as well as between accessory device sprockets 196 and 197. Further, crankshaft sprocket 194 may be positioned along a horizontal line that is between a horizontal line that passes through camshaft sprockets 185 and 187 and a horizontal line that passes through accessory device sprockets 196 and 197. In another example, crankshaft sprocket 194 could be arranged along a horizontal line that is vertically below a horizontal line that passes through camshaft sprockets 185 and 187. Accessory device sprockets 196 and 197 may be positioned along a horizontal line that is vertically below a horizontal line that passes through crankshaft sprocket 194. In another example, accessory device sprocket 196 could be on a horizontal line vertically below a horizontal line passing through crankshaft sprocket 194 and accessory device sprocket 197 could be on a horizontal line vertically above a horizontal line passing through crankshaft sprocket 194. Idling device 189 is shown on a vertical line that also passes through crankshaft sprocket 194 and idling device 189 is positioned along a horizontal line that is vertically below a horizontal line that passes through camshaft sprockets 185 and 187. However, it will be appreciated that idling device 189 may be arranged in a different geometric configuration. The engine drive system 100, as shown in FIG. 1 and described above, permits crankshaft sprocket 194 to be positioned within a central area relative to camshaft sprockets 185 and 187 and accessory device sprockets 196 and 197. Such a geometric configuration allows for a more compact design, if desired.

As described above, FIG. 1 shows only one cylinder of a multi-cylinder engine, and each cylinder may similarly include its own set of intake/exhaust valves, camshafts, crankshafts and accessory devices etc. coupled to the engine drive system 100, or alternatively coupled to another drive system.

FIG. 2 depicts another engine drive system that may be implemented in a V-engine with single overhead cams, for example. To avoid repetition, FIG. 2 shows selected components of an engine that differ from the layout of engine 100, however, the description with regard to FIG. 1 of the various details of the bands, pulleys, applies to FIG. 2 (and FIG. 3).

Similar to the previous example, engine drive system 200, uses a band 290 to synchronize various rotating parts. As with band 190, band 290 may be a timing belt or timing chain, and may be formed as a single continuous band that follows a serpentine path. Band 290 has a first contacting side 227 and a second contacting side 229 opposite side 227. Band 290 may also have two additional side edges, for example, that may not be a contacting side. The contacting sides 227 and 229 may engage various components of the engine drive system 200 with a reflex wrap angle, as described above, in order to drive those components. Additionally, band 290 may engage some devices with a wrap angle that is smaller than a reflex wrap angle. Examples of such devices that may engage with band 290 are discussed in greater detail below.

Engine drive system 200 may further include camshaft sprockets 286, crankshaft sprocket 294, accessory device sprockets 296 and 297, idling device 289 and tensioning device 298, as shown. As another example, engine drive system 200 may be configured without tensioning device 298, and further, engine drive system 200 may include more than one idling device 289. Conversely, engine drive system 200 may be configured without an idling device.

Camshaft sprockets 286 may be coupled to valve trains 282 such that they rotate together. Valve trains 282 may be positioned on opposing banks of the V-engine and are shown with cams 251 and 253 that stimulate intake valves and exhaust valves respectively. This arrangement is referred to as a single overhead cam (SOHC) system. Band 290 may engage camshaft sprockets 286 with first contacting side 227 which may rotate camshaft sprockets 286 together with valve trains 282 in direction R1. Band 290 may make contact with camshaft sprockets 286 such that a reflex wrap angle may be achieved.

Crankshaft sprocket 294 is coupled to crankshaft 240 such that they rotate together. Band 290 may engage crankshaft sprocket 294 with second contacting side 229 which may rotate crankshaft sprocket 294 together with crankshaft 240 in direction R2, opposite of direction R1. Band 290 may make contact with crankshaft sprocket 294 such that a reflex wrap angle may be achieved. In this way, crankshaft 240 is configured such that its direction of rotation is opposite that of valve trains 282.

As with engine 100, accessory device sprockets 296 and 297 may be coupled to various accessory devices such as an oil pump, a balance shaft, a water pump, a power steering pump, an air conditioning compressor, a fan, and a fuel pump, which are provided as non-limiting examples. As shown, the plurality of accessory drive sprockets 296 and 297 may engage with band 290 via first contacting side 227 and rotate in direction R1; however, it will be appreciated that one or more accessory drive sprockets 296 and 297 may additionally or alternatively engage with second contacting side 229 and rotate in direction R2. Further, in another example, a first accessory may engage first contacting side 227, and a second accessory may engage second contacting side 229, which may provide a rotation of the first accessory in direction R1 and a rotation of the second accessory in direction R2, respectively. The plurality of accessory device sprockets 296 and 297 may engage with band 290 with a reflex wrap angle. As another example, device sprockets 296 and 297 may engage with band 290 with a wrap angle that is less than a reflex angle.

The configuration as shown in FIG. 2 represents four cylinders of a V-engine, although it will be appreciated that engine drive system 200 may include additional sets of cams that stimulate intake/exhaust valves, and additional pistons coupled to the crankshaft. Alternatively, engine drive system 200 may comprise fewer sets of cams that stimulate intake/ exhaust valves, and fewer pistons coupled to the crankshaft. For example, engine 200 may be a V-6 engine, V-8 engine, and the like.

FIG. 3 depicts another engine drive system that may be implemented in a V-engine with dual overhead cams (DOHC), for example.

Similar to the previous example, engine drive system 300, uses a band 390 to synchronize various rotating parts. Band 390 may be a timing belt or timing chain, and may be formed as a single continuous band that follows a serpentine path. Band 390 has a first contacting side 327 and a second contacting side 329 opposite side 327. Band 390 may also have two additional side edges, for example, that may not be a contacting side. The contacting sides 327 and 329 may engage various components of the engine drive system 300 with a reflex wrap angle, as described above, in order to drive those components. Additionally, band 390 may engage some devices with a wrap angle that is smaller than a reflex wrap angle. Examples of such devices that may engage with band 390 are discussed in greater detail below.

Engine drive system 300 may further include camshaft sprockets 386, crankshaft sprocket 394, accessory device sprockets 396 and 397, idling device 389 and tensioning device 398, as shown. As another example, engine drive system 300 may be configured without tensioning device 398, and further, engine drive system 300 may include more than one idling device 389. Conversely, engine drive system 300 may be configured without an idling device.

Camshaft sprockets 386 may be coupled to valve trains 382 such that they rotate together. Valve trains 382 may be positioned on opposing banks of the V-engine and are shown with cams 351 that stimulate intake valves, for example. Band 390 may engage camshaft sprockets 386 with first contacting side 327 which may rotate camshaft sprockets 386 together with valve trains 382 in direction R1. Band 390 may make contact with camshaft sprockets 386 such that a reflex wrap angle may be achieved. In this example, camshaft sprockets 386 are additionally coupled to camshaft sprockets 380 via bands 310 such that camshaft sprockets 386 and 380 rotate together. Bands 310 engage with camshaft sprockets 386 such that bands 310 do not interfere with band 390. In other words, bands 310 and band 390 make contact with camshaft sprockets 386 in different areas. For example, camshaft sprockets 386 may have more than one ring of teeth that are arranged in parallel or concentrically to engage with holes in bands 310 and 390. As another example, camshaft sprockets 386 may have more than one groove arranged in parallel or concentrically to make contact with bands 310 and 390. Further, camshaft 386 may have teeth and grooves arranged in parallel or concentrically that may engage with a timing chain and a timing belt, for example.

Camshaft sprockets 380 are shown coupled to valve trains 384 such that they rotate together. Valve trains 384 may be positioned on opposing banks of the V-engine and are shown with cams 353 that stimulate exhaust valves, for example. A valve train 384 together with a valve train 382 may be arranged on the same bank such that each cylinder (not shown) includes an intake valve stimulated by cam 351 and an exhaust valve stimulated by cam 353. This arrangement is known as a dual overhead cam system, and each cylinder may have more than one intake valve and more than one exhaust valve.

Crankshaft sprocket 394 is coupled to crankshaft 340 such that they rotate together. Band 390 may engage crankshaft sprocket 394 with second contacting side 329 which may rotate crankshaft sprocket 394 together with crankshaft 340 in direction R2, opposite of direction R1. Band 390 may make contact with crankshaft sprocket 394 such that a reflex wrap angle may be achieved. In this way, crankshaft 340 is configured such that its direction of rotation is opposite that of valve trains 382.

Accessory device sprockets 396 and 397 may be coupled to various accessory devices such as an oil pump, a balance shaft, a water pump, a power steering pump, an air conditioning compressor, a fan, and a fuel pump, which are provided as non-limiting examples. As shown, the plurality of accessory drive sprockets 396 and 397 may engage with band 390 via first contacting side 327 and rotate in direction R1; however, it will be appreciated that one or more accessory drive sprockets 396 and 397 may additionally or alternatively engage with second contacting side 329 and rotate in direction R2. Further, in another example, a first accessory may engage first side 327, and a second accessory may engage second side 329, which may provide a rotation of the first accessory in direction R1 and a rotation of the second accessory in direction R2, respectively. The plurality of accessory device sprockets 396 and 397 may engage with band 390 with a reflex wrap angle. As another example, device sprockets 396 and 397 may engage with band 390 with a wrap angle that is less than a reflex angle.

The configuration as shown in FIG. 3 represents eight cylinders of a V-engine, although it will be appreciated that engine drive system 300 may include additional sets of cams that stimulate intake/exhaust valves, and additional pistons coupled to the crankshaft. Alternatively, engine drive system 300 may comprise fewer sets of cams that stimulate intake/exhaust valves, and fewer pistons coupled to the crankshaft.

Note that in the example of FIG. 3, the drive system includes a first band coupling a crankshaft and a first and second camshaft via opposite sides of the first band, while the first camshaft is coupled to a third camshaft via common sides of a second band. Further, one or both of the sides of the first band may additionally drive accessories. Additionally, the second camshaft is coupled to a fourth camshaft via common sides of a third band.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle engine comprising:
a total of exactly six sprockets engaging a timing band;
two camshafts including a first camshaft sprocket and a second camshaft sprocket of the six sprockets;
a crankshaft including a crankshaft sprocket of the six sprockets coupled to a drive wheel of the vehicle; and
a first accessory device sprocket of the six sprockets;
wherein the timing band rotatably couples the first camshaft sprocket, the second camshaft sprocket, the crankshaft sprocket, and the first accessory device sprocket, the timing band having a first side engaging the first camshaft sprocket and the second camshaft sprocket and a second, opposite side engaging the crankshaft sprocket.

2. The system of claim 1, further comprising a second accessory device sprocket and wherein the crankshaft sprocket is totally within an area defined by the first and second accessory device sprockets and the first and second camshaft sprockets.

3. The system of claim 2, wherein the first accessory device sprocket engages a drive shaft of an oil pump.

4. The system of claim 3, wherein the crankshaft sprocket has a diameter that is less than a diameter of the first camshaft sprocket, and where the total of exactly six sprockets engage the timing band.

5. The system of claim 1, wherein the first accessory device sprocket is coupled to a balance shaft.

6. The system of claim 1 further comprising a plurality of accessories engaged with the timing band, the accessories including an oil pump, a balance shaft, a water pump, a power steering pump, an air conditioning compressor, and a fuel pump.

7. The system of claim 1, further comprising an idling device sprocket of the six sprockets engaged with the second, opposite side of the band.

8. The system of claim 7, further comprising a tensioning device that engages the timing band.

9. The system of claim 1, wherein the timing band is a single continuous timing band that engages the first and second camshaft sprockets with the first side of the timing band and the crankshaft sprocket with the second, opposite side of the timing band, wherein the single continuous timing band also engages a tensioning device.

10. The system of claim 9, wherein a reflex wrap angle of the first and second camshaft sprockets and the crankshaft sprocket is at least 180 degrees.

11. A method for a camshaft drive system, comprising:
rotating a timing band around a total of six sprockets including two camshaft sprockets, a crankshaft sprocket, two accessory drive sprockets, and an idler sprocket;
rotating the two camshaft sprockets in a first direction via a first side of the timing band; and
rotating the crankshaft sprocket in a second, opposite direction via a second, opposite side of the timing band, the crankshaft sprocket coupled to a crankshaft in mechanical communication with a vehicle drive wheel.

12. The method of claim 11, wherein the idler sprocket is completely within an area defined by the two camshaft sprockets and the two accessory drive sprockets.

13. The method of claim 11, wherein the crankshaft sprocket is completely within an area defined by the two camshaft sprockets and the two accessory drive sprockets.

14. The method of claim 11, wherein the two accessory drive sprockets are coupled to at least two accessories including one or more of an oil pump, a balance shaft, a water pump, a power steering pump, an air conditioning compressor, a fan, and a fuel pump.

15. The method of claim 11, wherein the camshaft drive system is in an engine, wherein the engine is a V-engine and wherein the two camshaft sprockets are coupled to valvetrains on opposing banks of the V-engine.

16. A system for a vehicle engine comprising:
a pair of camshafts coupled to respective first and second camshaft sprockets;
a crankshaft coupled to a drive wheel of the vehicle and including a crankshaft sprocket;
an idling sprocket;
a first accessory sprocket and a second accessory sprocket;
a timing band rotatably coupling a total of six sprockets including the first and second camshaft sprockets, the crankshaft sprocket, the first and second accessory sprockets, and the idling sprocket, the timing band being a single continuous band arranged in an H shape, vertical sides of the H shape extending above the idling sprocket and below the crankshaft sprocket.

17. The system of claim 16, wherein the timing band engages the pair of camshafts via the respective first and second camshaft sprockets on a first side with a first rotation, and the crankshaft via the crankshaft sprocket on a second side opposite the first side, with a second rotation opposite the first rotation;
wherein the timing band further engages the first and second camshaft sprockets and the crankshaft sprocket with a wrap angle of 180 degrees or more.

18. The system of claim 17, further comprising a plurality of accessories engaged with the timing band, the accessories including one or more of an oil pump, a balance shaft, a water pump, a power steering pump, an air conditioning compressor, and a fuel pump.

19. The system of claim 17, further comprising a tensioning device that engages the timing band, and two additional camshafts, one of the two additional camshafts coupled to one camshaft of the pair of camshafts, the other of the two additional camshafts coupled to the other of the pair of camshafts.

20. The system of claim 17, wherein the engine is a V-engine comprising:
a front end accessory drive, the front end accessory drive including the pair of camshafts, at least one camshaft of the pair of camshafts on a first bank of the V-engine and at least one other camshaft of the pair of camshafts on a second, opposing bank of the V-engine.

\* \* \* \* \*